358-86 SR
8/4/87 OR 4,684,981

United States Patent [19]

Toyoshima et al.

[11] Patent Number: 4,684,981

[45] Date of Patent: Aug. 4, 1987

[54] DIGITAL TERMINAL ADDRESS TRANSMITTING FOR CATV

[75] Inventors: Masakatsu Toyoshima, Tokyo; Yasuhiro Hideshima, Saitama; Etsumi Fujita, Kanagawa, all of Japan

[73] Assignee: Sony Corporation, Tokyo, Japan

[21] Appl. No.: 669,376

[22] Filed: Nov. 8, 1984

[30] Foreign Application Priority Data

Nov. 9, 1983 [JP] Japan ............................... 58-210353

[51] Int. Cl.[4] ............................................ H04N 7/10
[52] U.S. Cl. ............................................ 358/86; 455/4
[58] Field of Search ..................... 358/86; 455/3, 4, 5, 455/6

[56] References Cited

U.S. PATENT DOCUMENTS 3,757,225 9/1973 Ulicki ............................... 358/86 X
3,997,718 12/1976 Ricketts et al. .................. 358/86 X
4,513,315 4/1985 Dekker et al. ....................... 358/86
4,554,579 11/1985 Citta ................................... 358/86
4,591,906 5/1986 Morales-Garza et al. .

FOREIGN PATENT DOCUMENTS 103438 3/1984 European Pat. Off. .............. 358/86
144770 6/1985 European Pat. Off. .............. 358/86
59-15387 1/1984 Japan .................................... 358/86
59-15388 1/1984 Japan .................................... 358/86

OTHER PUBLICATIONS

Jonathan H. Stott, "Design Technique for Asynchronous Digital Video and Audio Signals," IEEE Transactions on Communications, vol. Com-26, No. 5, May 1975, pp. 601-610.

*Primary Examiner*—Keith E. George
*Attorney, Agent, or Firm*—Lewis H. Eslinger; Alvin Sinderbrand

[57] ABSTRACT

Digital signals of up to four different modes are produced for transmission over an unused television channel in an existing cable television transmission line. No more bandwidth is required than that normally required by a single existing television channel. The various modes of digital signals all include synchronizing signals and service bit signals which are used to address any of the numerous terminals at the receiving side to control access to the various modes of digital signals transmitted over the single channel. By controlling the transmission of the modes to have constant time intervals, which can be selected based upon different sampling times, high quality audio signals may be transmitted or/and data channels or monaural audio signals, all of which may be transmitted over the single cable television transmission line.

4 Claims, 24 Drawing Figures

DIGITAL TERMINAL ADDRESS TRANSMITTING FOR CATV

BACKGROUND OF THE INVENTION

1. Field of the Invention

This invention relates generally to a digital signal transmitting and receiving system and, more specifically, to a system for use in transmitting a digital signal such as might be derived by digitally converting an analog stereo signal, announcement signal, facsimile data signal, or a computer game program, on a cable television transmission line using a single, unused television channel having a bandwidth of approximately 6 MHz.

2. Description of the Background

In order to better understand the signal transmitting system of this invention an overall system suitable for employing the present invention is first described. The present invention is intended to employ a cable television (CATV) transmission line and FIG. 1 shows a digital signal transmitting system for use with such transmission line. Input terminals 201–204 are arranged to receive analog signals, which might be analog stereo signals, and such input signals are fed to analog-to-digital convertors 207–210, respectively. The resultant digital signals from analog-to-digital convertors 207–210 are then fed to a multiplexer 213 that produces at its outputs two serial data streams that represent the four input signals having been time division multiplexed. Time division multiplexing is a known approach to transmitting a number of signals over a commmon path by using different time intervals for the transmission of the intelligence of each message signal. Then, the time division multiplexed digital signals from multiplexer 213 are fed to a filter 214, which is provided to suppress intersymbol interference that causes code error. Filter 214 may advantageously comprise a binary transversal filter having tap coefficients adjusted so that the modulation signal satisfies Nyquists's first criterion. The output of filter 214 is fed to a four-level convertor 215 which may be thought of as operating as a digital-to-analog convertor so that it converts the input digital signals to a four-level, base-band signal. This four-level analog signal produced by four-level convertor 215 has four different amplitude values ranging from zero to three, which are respectively expressed as "0"+"0"="0", "0"+1"="1", "1"+"0"="2", and "1"+"1"="3". This pseudo-analog output signal is fed to an amplitude-modulation (AM) modulator 216 wherein it AM modulates an intermediate frequency signal (IF) having a frequency of 38.9 MHz, for example, supplied by oscillator 217. The output of the AM modulator 216 is fed through a vestigial side-band filter 218 to a mixer 219. This vestigial side-band modulation is the same as in conventional television transmissions. Thus, the filtered signal is mixed in mixer 219 with an RF signal ($f_c+f_{if}$) supplied by a local oscillator 220. The output signal of mixer 219 represents a modulated signal having a carrier frequency $f_c$ of 97.25 MHz, for example, and such output signal is fed through a bandpass filter 221 to output terminal 222 as the modulated, system output signal, the bandwidth of which is limited to 6 MHz. The output signal developed at output terminal 222 is then fed to a head end of a CATV system (not shown). Thus, the original input signals are placed in an unused television channel on a conventional cable television transmission line and require no more bandwidth (6 MHz) then a typical single television channel.

FIG. 2 shows a system for "receiving" a signal as might be placed on the CATV transmission line by the sytem of FIG. 1, in which the modulated signal transmitted through the transmission line of the CATV system is supplied at input terminal 231 to a wide bandwidth receiver front end 232 where it is amplified and converted to an intermediate frequency (IF) signal of 58.7 MHz, for example, and this intermediate frequency signal is supplied to a phase-locked loop (PLL) synchronous detector 233, which functions as an AM detector, so that the four-level, base-band signal, as produced by the four-level convertor 215 of FIG. 1, is demodulated. An automatic gain control (AGC) circuit 246 is provided with an input from PLL detector 233 and produces an output control signal fed to front end 232 to prevent overloading of the front end amplifier. The output signal from the phase-locked loop detector 233 is fed to a level comparator 234, which operates as a kind of analog-to-digital convertor, by demodulating the detected signal and producing a series digital signal having four possible values, "0", "1", "2", and "3", on the basis of whether the output signal from the PLL detector 233 exceeds a reference level, as represented by a so-called eye pattern. The eye pattern is generally known in data transmission by an oscilliscope display of the detector voltage waveform in a data modulator/-demodulator. This pattern gives a convenient representation of cross-over distortion and can be derived in the known fashion, based upon the overall frequency characteristics of the system and the relationship thereto between the Nyquist frequency and the transmission capacity of the system in bits per second.

The digital signal thus essentially demodulated by level comparator 234 is fed to a demultiplexer 235. Also produced by the level comparator 234 is a bilevel synchronizing signal fed to a clock reproducing circuit 245 that produces a bit clock signal applied to demultiplexer 235 to control the output thereof in the appropriate time-division manner. Also produced by clock reproducing circuit 245 is a synchronizing signal fed to both the automatic gain control circuit 246, as well as to demultiplexer 235. Demultiplexer 235 then produces a plurality of digital signals in a time-division manner that are supplied, respectively, to digital-to-analog (D/A) convertors 239–242, so that analog signals corresponding to the original input signals as applied at inputs 201–204, (FIG. 1) are respectively developed at output terminals 243–246.

Although the system described hereinabove would appear to be a workable and feasible system, in actuality such system is not available for use in an effective and usable form, principally because of the lack of an economical method of addressing the receiver terminals.

The problem is that in a transmission system, such as cable television, in which the signal is transmitted through a cable, that is, hard wired, at the receiving side at which the signals are being distributed there may be fewer than several hundred receivers, or there may be up to several tens of thousands of receivers. In other words, there is a wide spread in the number of receiving units that may be connected to the cable television transmission line. In the proposed systems, each of the receiver terminals usually has an individual address signal and the transmitter side then transmits a control signal corresponding to each address number, wherein the receiving state of each receiver terminal can be controlled.

In the systems proposed to use cable television transmission lines as outlined above, the control signal that corresponds to each address is formed as a bit series, which can cover the maximum number of receiver terminals and in most cases this involves a bit series of approximately 20 bits. The control signal used to perform such addressing is then transmitted using a special address network line that is different from the data network line. Accordingly, if such address network line is designed to permit it to accommodate a system having a large number of receiver terminals, for example, ranging from several tens of thousands to several hundred thousand, then this address network line will be uneconomical and will be too sophisticated and expensive for systems having substantially fewer terminal receivers. On the other hand, if the address network line is designed to accommodate a system having, for example, fewer than several hundred terminals then such address network line is almost unusable when applied to a system having a substantially greater number of receiver terminals and, thus, the address network lines must be increased correspondingly.

Accordingly, as described above, while the concept of a system for transmitting digital signals on a cable television transmission line is feasible, the data addressing system is not available such that the address network lines need not be changed in accordance with the scale of the system, in order to eliminate the redundancy and uneconomical provision of more address network lines than required for the smaller size system. Furthermore, because special address network lines must be provided, the data addressing system becomes complex in its circuit arrangement and is thereby expensive in view of the associated manufacturing costs.

OBJECTS AND SUMMARY OF THE INVENTION

Accordingly, it is an object of the present invention to provide an improved digital signal transmitting and receiving system that can overcome the above-noted shortcomings inherent in the prior art.

It is another object of the present invention to provide a digital signal transmitting and receiving system for transmitting a digital audio signal or digital data signal using the transmission line of a cable television network.

It is a further object of the present invention to provide a digital signal transmitting and receiving system suitable for transmitting digital audio signals or digital data signals in which a large number of receiver terminals of a cable television system can be addressed without requiring special addressing network lines.

According to one aspect of the invention a digital signal transmitting system is provided including a circuit generating digital word signals in a first mode in which each of the signals consists of a word synchronizing signal, and data signals having a first bit code and being sampled at a first sampling frequency and a circuit for generating digital word signals in a second mode, each of the word signals in the second mode consisting of a word synchronizing signal and data signals having a second bit code and being sampled at a second sampling frequency and a selective transmitter that selectively transmits the first mode of digital word signals and the second mode of digital word signals through a transmission line of a cable television system.

According to another aspect of the present invention a digital signal receiving system is provided that includes a circuit to receive digital signals in a first mode in which the first mode digital signals consist of a word synchronizing signal, a first service bit signal, and data signals having a first bit code and being sampled by a first sampling frequency and for receiving a second mode of digital word signals, each consisting of a word synchronizing signal, a second service bit signal, and data signals including second bit codes and being sampled at a second sampling frequency. A demodulator is connected to the signal input terminal of the receiver and latches the first mode of the digital word signals and converts the digital word signals to analog signals. A second demodulator is provided that is connected to the signal input terminal of the receiver and latches the second mode of digital word signals and also converts such signals into analog signals. A control system is provided that controls the mode of the first and second demodulators in order to selectively enable one or the other in response to a mode control signal.

In yet another embodiment of the invention the transmitter and receiver are combined into a complete system in which a single transmitter can provide digital data for a plurality of receivers and such plurality of receivers may be accessed or addressed using only the cable television transmission line over which the actual data signals are transmitted.

The above and other objects, features, and advantages of the present invention will become apparent from the following detailed description of illustrative embodiments thereof to be read in conjunction with the accompanying drawings.

DESCRIPTION OF THE PREFERRED EMBODIMENTS

Figure 1:
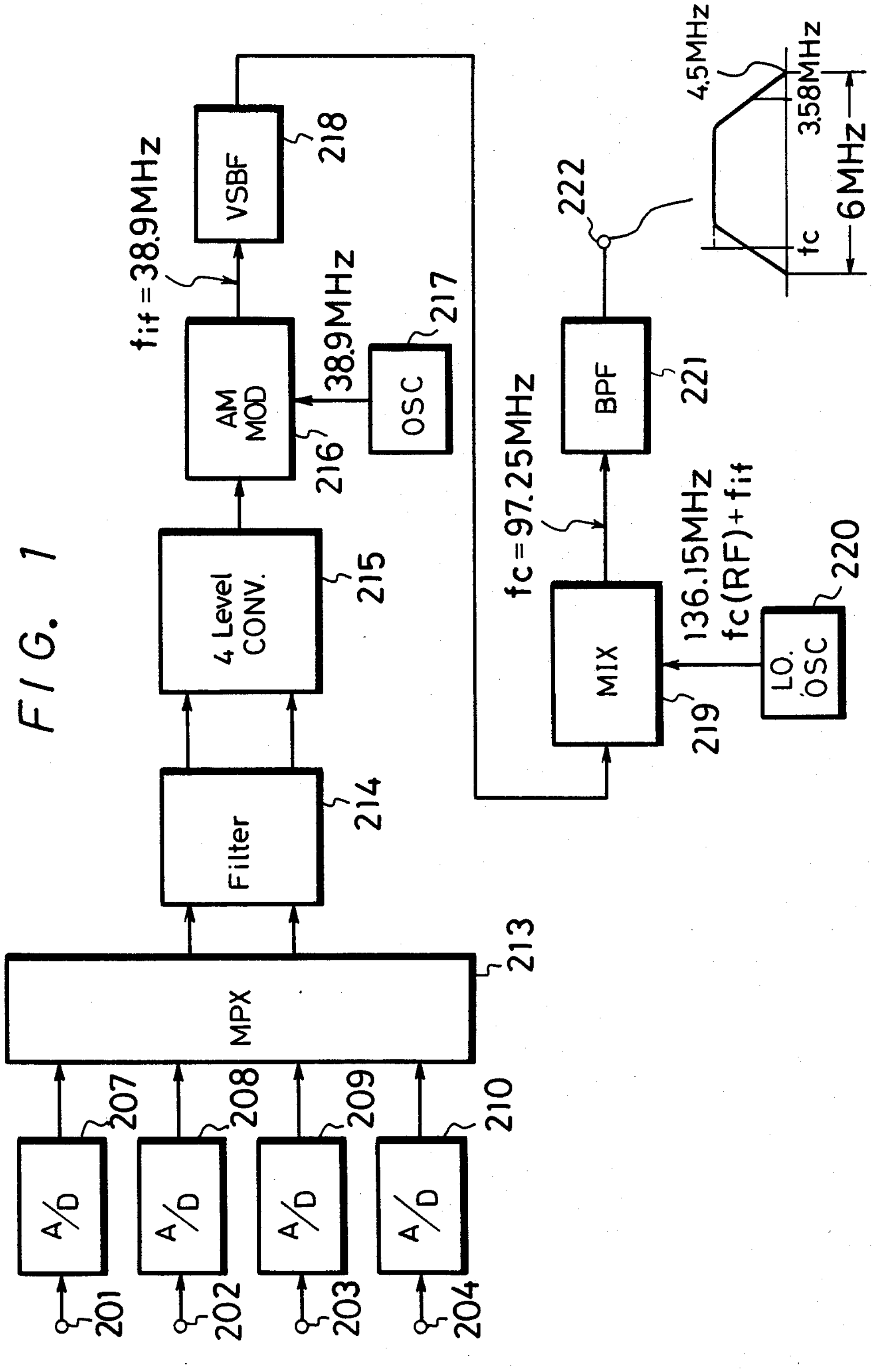
FIG. 1 is a schematic in block diagram form of a digital data transmitting system using a cable television transmission line suitable for use with the present invention.
Figure 2:
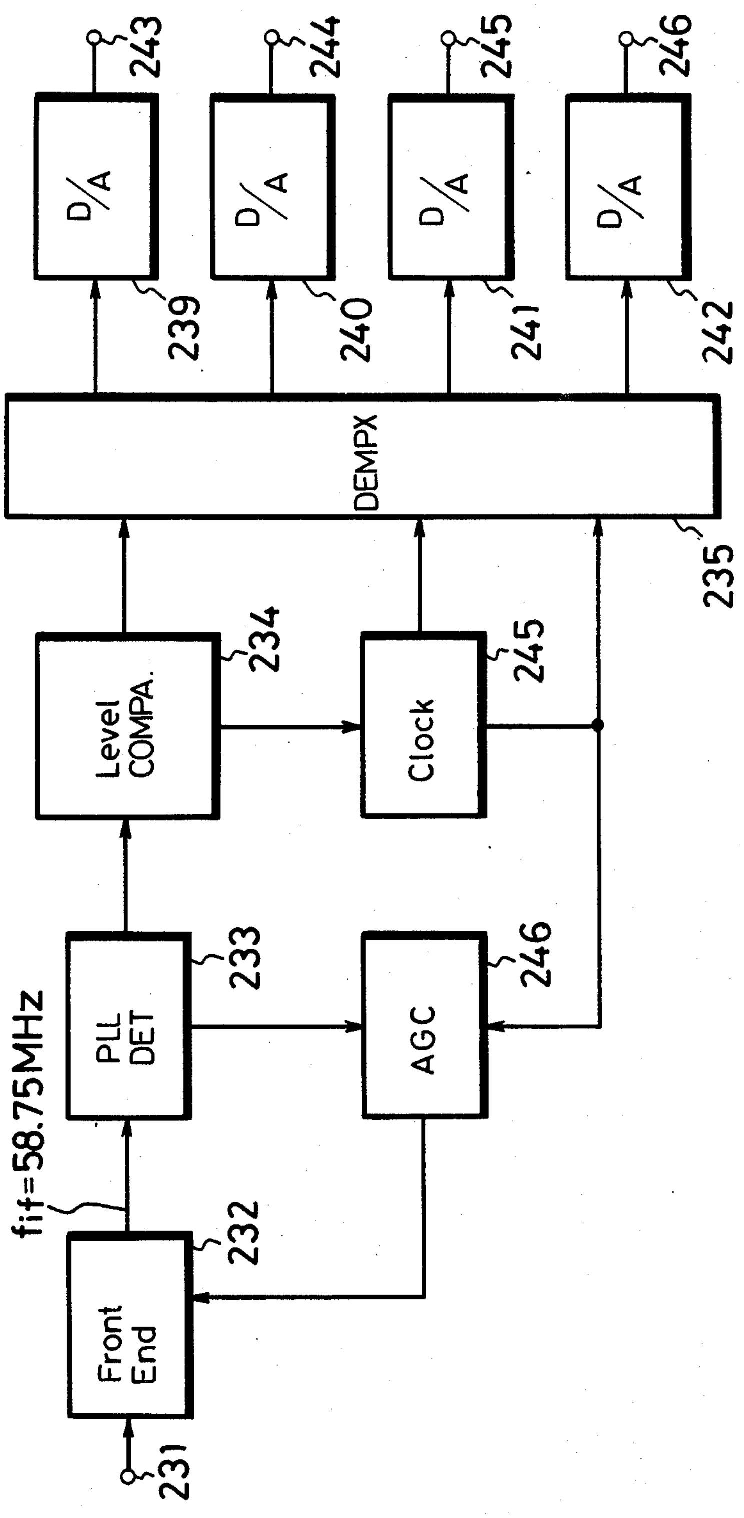
FIG. 2 is a digital signal receiving system employing a cable television transmission line suitable for use with the present invention.
Figure 3A:
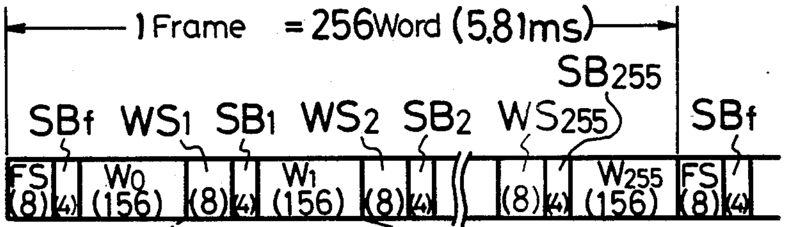
FIGS. 3A and 3B represent digital signal formats used in a digital signal transmitting system according to the present invention.
Figure 3B:
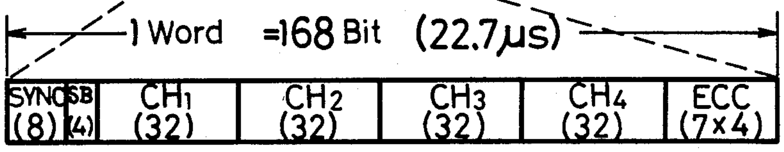

While FIGS. 1 and 2 have been described hereinabove as being exemplary of digital data transmission and receiving systems, the present invention as it relates to the addressing network is described in relation to FIGS. 3 through 13 and, in particular, FIGS. 3A and 3B represent a data format according to the present invention. In FIG. 3A, one frame is shown as being formed of 256 words, which at the preferred transmission rate corresponds to 5.81 ms. Each frame begins with a frame synchronizing signal FS formed of eight bits and is followed by a service bit word of four bits and a first data word W0 of 156 bits. Thereafter, are the remaining 255 data words, W1 to W255, each word being formed of 156 bits, each beginning with word synchronizing signals $WS_1$ to $WS_{255}$ and each being formed of eight bits, and service bit words $SB_1$ to $SB_{255}$, each being formed of four bits, respectively. Note that the frame synchronizing signal FS also serves as the word synchronizing signal ($WS_0$) for the first data word W0.

FIG. 3B represents one of the 256 words of a frame and, as shown therein, the eight bits of the synchronizing signal SYNC are at the beginning of the word followed by the four service bits and then the data word is made up of four data channels, $CH_1$–$CH_4$, each data channel having a data length of 32 bits and a sampling frequency of 44.1 KHz, and an error correction code ECC. An error correction code is added at each of the respective data channels $CH_1$–$CH_4$ and may comprise a Bose-Chaudhuri-Hocquenghem (BCH) code or Extended Hamming Code, each having a length of seven bits.

Figure 4A:
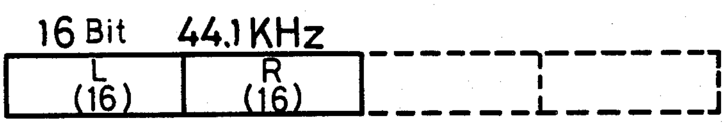
FIGS. 4A–4D schematically represent digital signal formats for use in an embodiment of a digital signal transmitting system according to the present invention.

FIGS. 4A–4D illustrate data formats for a plurality of different operating modes of the present invention and, specifically, FIG. 4A represents a first mode (A) in which 32-bit data represents a stereo digital audio signal such that a left channel stereo signal L includes 16 bits and a right channel stereo signal R includes the similar 16 bits. This 16-bit data format is based upon a sampling frequency of 44.1 KHz and is the same data format as the presently available compact audio disc (CAD), which is fast becoming a very popular music source for high quality stereo music programs.

Figure 4B:
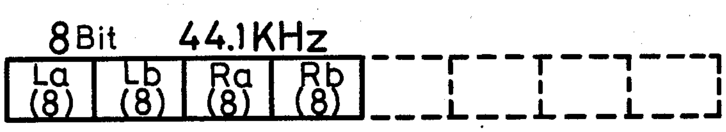

FIG. 4B represents a second mode (B) in which the data format of 32 bits are divided into four sets of eight bits and can represent two channels of stereo signals La, Ra and Lb, Rb. This format provides data suitable for multichannel stereo music, not quite of the extreme high quality of mode A represented in FIG. 4A. The quality of sound according to mode B is the equivalent to, or better than, conventional FM broadcasting.

Figure 4C:
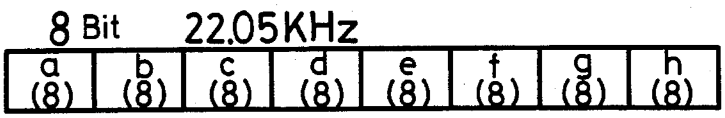
Figure 4D:
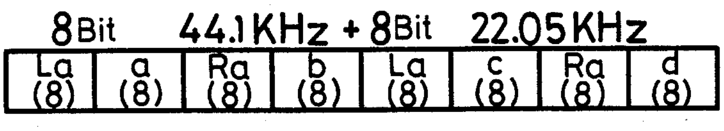

Another mode (C) is represented in FIG. 4C, in which an 8-bit data format is provided and in which the sampling frequency of 44.1 KHz of FIGS. 4A and 4B is halved to provide a sampling frequency of 22.05 KHz. This results in a data format that can provide eight monaural channels a to h which are suitable for monaural voice service, such as news, weather forecasts, communications, and the like. Mode (D) is represented in FIG. 4D and is a combination of modes (B) and (C) and can be used to transmit one high fidelity stereo program and four monaural audio programs. In such case, the 8-bit stereo channels employ a frequency of 44.1 KHz resulting in two channels of eight bits, each intermixed with four monaural mode channels, having a frequency of 22.05 KHz. The mode represented in FIG. 4D realizes a plurality of modes within a single data channel and, thus, provides an elaborate service capability. Note that in FIGS. 4A–4D no attempt is made to show the exact time relationship between the various modes, and the various modes in these Figs. are not drawn to scale.

There are twenty five different combinations of the above-described modes, that is, twenty five different systems can be specified simply by altering the programming of both the transmitting and receiving sides, without modifying the hardware. Nevertheless, considering a data output system according to combinations of the these modes in which the sampling frequency is either 22.05 KHz, or 44.1 KHz, the data length is either eight bits or sixteen bits and the signal system is either monaural or stereo, then eight different mode combinations can be tabulated. These are set forth in the following Table I.

TABLE I

| signal transmission system | S | S | S | S | M | M | M | M |
|---|---|---|---|---|---|---|---|---|
| data length | 16 | 16 | 8 | 8 | 16 | 16 | 8 | 8 |
| sampling frequency | 4 | 2 | 4 | 2 | 4 | 2 | 4 | 2 |
| mode | S164 | S162 | S84 | S82 | M164 | M162 | M84 | M82 |

As seen in Table I, letters S and M designate stereo mode and monaural mode, respectively, reference numerals 4 and 2 designate sampling frequencies of 44.1 KHz and 22.05 KHz, respectively, and in the bottom row notations S162, S84, S82, M164, M162, M84, M82 designate different modes that are formed by combining the signal system, the data length, and the sampling frequency. For example, S164 indicates a mode wherein the signal is a stereo signal, the data length is sixteen bits, and the sampling frequency is 44.1 KHz, while M82 indicates a mode in which the signal is monaural, the data length is eight bits, and the sampling frequency is 22.05 KHz. The indications representing the other modes are similarly deduced.

Encoders suitable for generating the various modes described above in relation to FIGS. 4A–4D and in Table I are shown in FIGS. 5 through 9 and, of the above different modes shown in Table I, the fundamental modes thereof are S164, S84, S82, and M82 and, accordingly, an example of an encoder corresponding to each of such fundamental modes is described hereinbelow.

Figure 5:
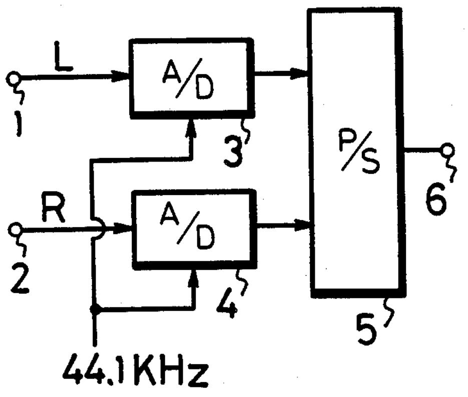
FIG. 5 is a block diagram of a digital signal generator according to an embodiment of the present invention.

FIG. 5 is a block diagram of an encoder for transmitting the S164 mode of Table I in which 32 bits of one data channel are divided into left and right channel stereo signals of sixteen bits each, with the sampling frequency of 44.1 KHz. This is the mode represented in FIG. 4A hereinabove. In FIG. 5, a left channel audio analog signal L is applied at input terminal 1 and a right channel analog signal R is supplied to input terminal 2, and the thus supplied analog signals are fed to respective analog-to-digital convertors (A/D) 3, 4 in which they are converted to digital signals based upon a sampling frequency of 44.1 KHz. The resultant digital signals are then the sixteen bit data words as shown in FIG. 4A. The respective digital signals from A/D convertors 3 and 4 are fed to a parallel-to-serial convertor (P/S) 5, wherein they are converted from two parallel signals to a serial signal, which is developed at output terminal 6 as the data output signal. Subsequently, this serial data signal at output terminal 6 can be further processed in accordance with any specific or particular use requirement, for example, when this data output signal is intended to be further transmitted using the transmission line of the cable television system the output data signal is amplitude modulated using the vestigial side-band system, as done in standard television systems, and then transmitted to the appropriate receiving side at the customer location.

Figure 6:
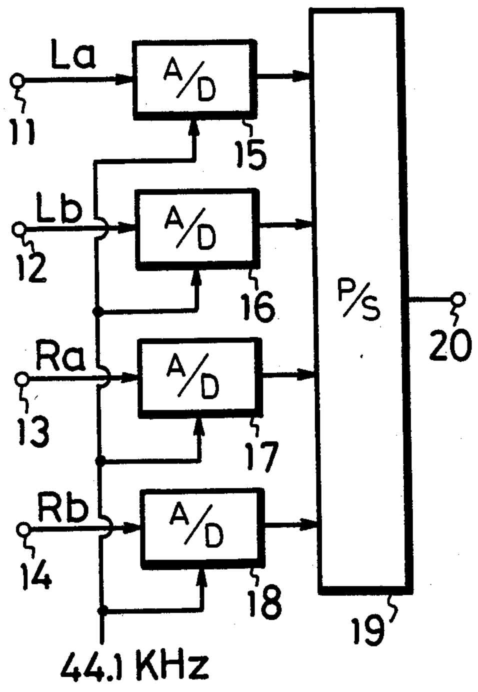
FIG. 6 is a block diagram of a digital signal generator according to another embodiment of the present invention.

FIG. 6 is a block diagram illustrating another example of an encoder and, specifically, an encoder corresponding to the S84 mode, which as set forth hereinabove is a fundamental mode of this system, in which 32 bits of one data channel are divided into four segments of eight bits, representing two left and two right stereo channel signals having a sampling frequency of 44.1 KHz. The input terminals for the left channel audio analog signals La and Lb are provided at 11 and 12, while the right channel analog signals Ra and Rb are supplied, respectively, to input terminals 13 and 14. The analog signals thus applied are fed to respective A/D convertors 15–18 in which they are converted based upon a sampling signal having a frequency of 44.1 KHz and thereby produce digital signals each data length of which is eight bits, as shown for example in FIG. 4B. These data signals in this "B" mode are then fed to a parallel-to-serial convertor 19 and are developed into a serial bit stream made available at output terminal 20. Again, this serial digital output signal can be modulated in accordance with the known television techniques and placed on a transmission line of a CATV system.

Figure 7:
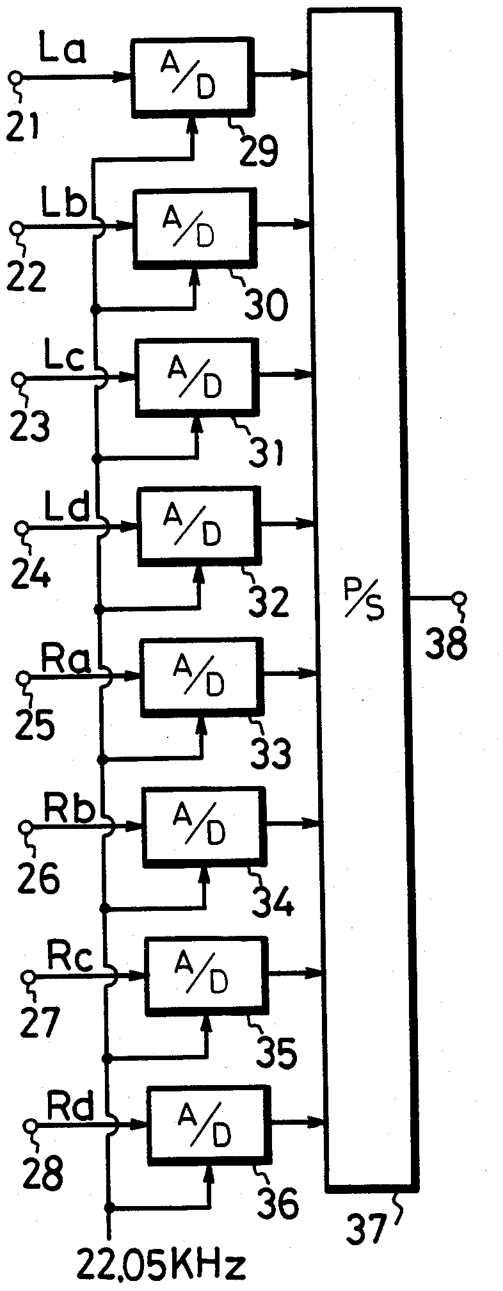
FIG. 7 is a block diagram of a digital signal generator according to another embodiment of the present invention.

An encoder for producing the "C" mode as represented in FIG. 4C, is shown in FIG. 7 in block diagram form in which the S82 mode is produced having 32 bits of one data channel divided into four sets of eight bits representing four channels of left and right stereo signals, with a sampling frequency of 22.05 KHz over two data words. Left channel analog signals La, Lb, Lc, and Ld are supplied respectively to input terminals 21, 22, 23, and 24 and right channel analog signals Ra, Rb, Rc, and Rd, are supplied to input terminals 25, 26, 27, and 28, respectively. The analog signals applied to input terminals 21–28 are supplied to respective A/D convertors 29–36 wherein they are converted to digital signals based upon a sampling signal having a frequency of 22.05 KHz. In this mode then the signals La, Lb, Lc, Ld, Ra, Rb, Rc, and Rd are sequentially provided within a period of 45.4 micro seconds, corresponding to the reciprocal of the sampling frequency, to a parallel-to-serial convertor 37, in which they are converted from the parallel signals to the serial signal stream which is then made available at output terminal 38, and again which can be signal processed according to any desired end use.

Figure 8:
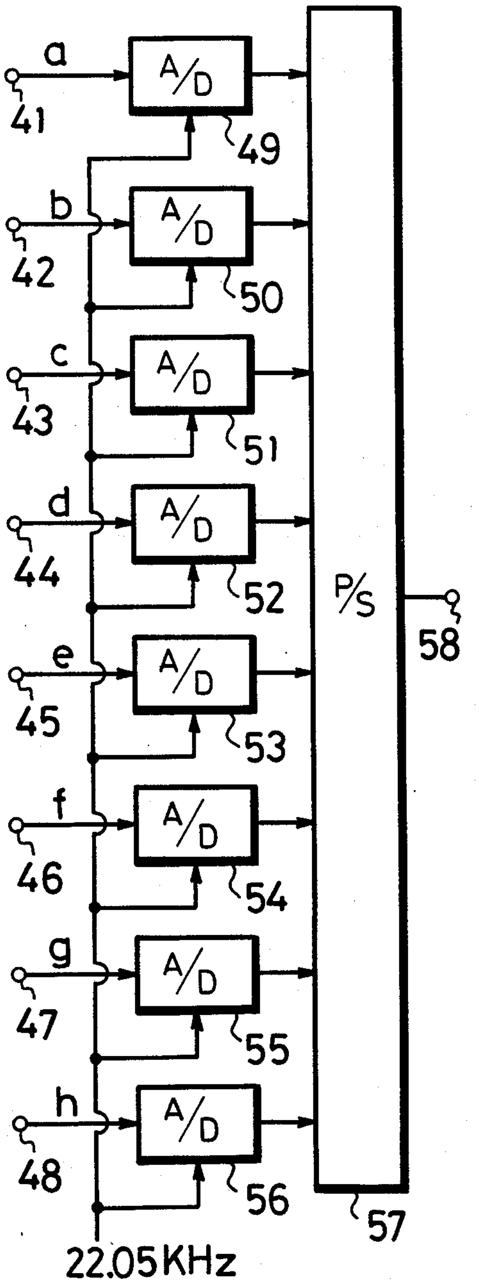
FIG. 8 is a block diagram of a digital signal generator according to another embodiment of the present invention.

FIG. 8 is a block diagram of an example of an encoder corresponding to the M82 mode, in which 32 bits of one data channel are respectively divided into four sets of eight bits representing eight channels of monaural signals and having a sampling frequency of 22.05 KHz over two words. The eight channel monaural signals a to h are fed in at input terminals 41–48, respectively, and are supplied to respective A/D convertors 49–56 wherein they are converted to digital signals on the basis of a sampling signal having a frequency of 22.05 KHz. Such digital signals will each have a data length of eight bits, as shown in FIG. 4C, and accordingly, this encoder produces the "C" mode discussed hereinabove. The digital signals are then fed to parallel-to-serial convertor 57 in which they are converted from the parallel signals to a serial bit stream which is then made available at output terminal 58 as the required data output signal.

Figure 9:
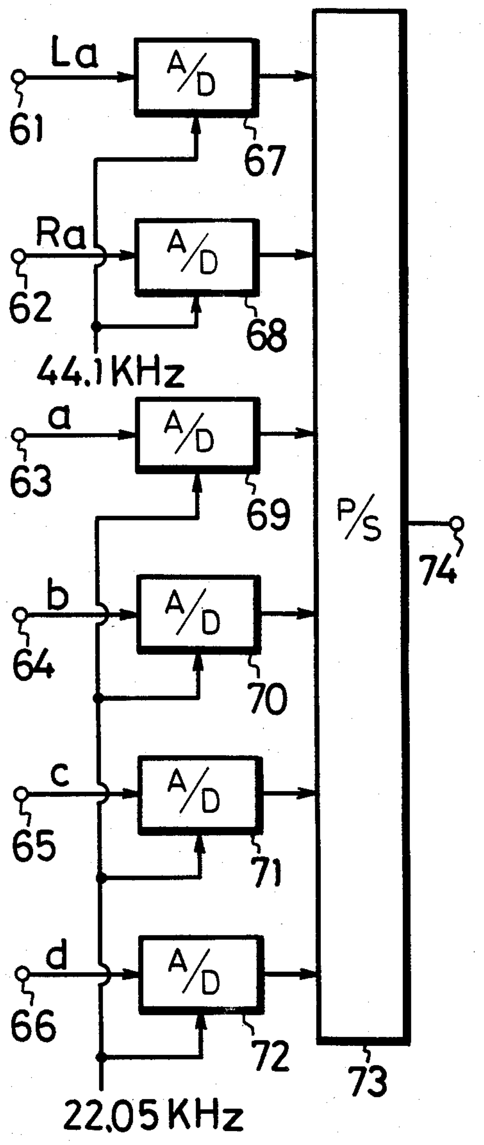
FIG. 9 is a block diagram of a digital signal generator according to a another embodiment of the present invention.

FIG. 9 is combination or a hybrid encoder capable of producing mode "D" as discussed above in which a plurality of different modes, for example, two modes such as the S84 mode, as shown in FIG. 6, and the M82 mode, as shown in FIG. 8 hereinabove. Thus, in FIG. 9, left channel analog signal La is fed in at input terminal 61 and right channel analog signal Ra is fed in at input terminal 62. These analog signals are then applied to respective A/D convertors 67 and 68 wherein they are converted to digital signals based upon a sampling signal having a frequency of 44.1 KHz and are then fed to parallel-to-serial convertor 73. Analog signals a to d of respective monaural channels are fed to input terminals 63–66 and are then applied to corresponding A/D convertors 69–72, respectively, wherein they are converted to digital signals, all of which have a similar sampling frequency of 22.05 KHz. The output of A/D convertors 69–72 are fed to parallel-to-serial convertor 73. Accordingly, parallel-to-serial convertor 73 is supplied with stereo signals and monaural signals and then converts the parallel digital signals into serial digital data stream and produces at output terminal 74 a mixed output data signal. More specifically, the encoder of FIG. 9 produces one channel of stereo signals having a sampling frequency of 44.1 KHz and data length of eight bits, and four channels of monaural signals having a sampling frequency of 22.05 KHz and also having a data length of eight bits.

Note that one frame is processed at a rate of 22.7 micro-seconds, which is derived as a reciprocal of the 44.1 KHz sampling frequency, and results in a transmission bit rate of approximately 7.4 mega bits per second (MBPS). This rate corresponds to the general transmission capacity of a CATV system.

Figure 10:
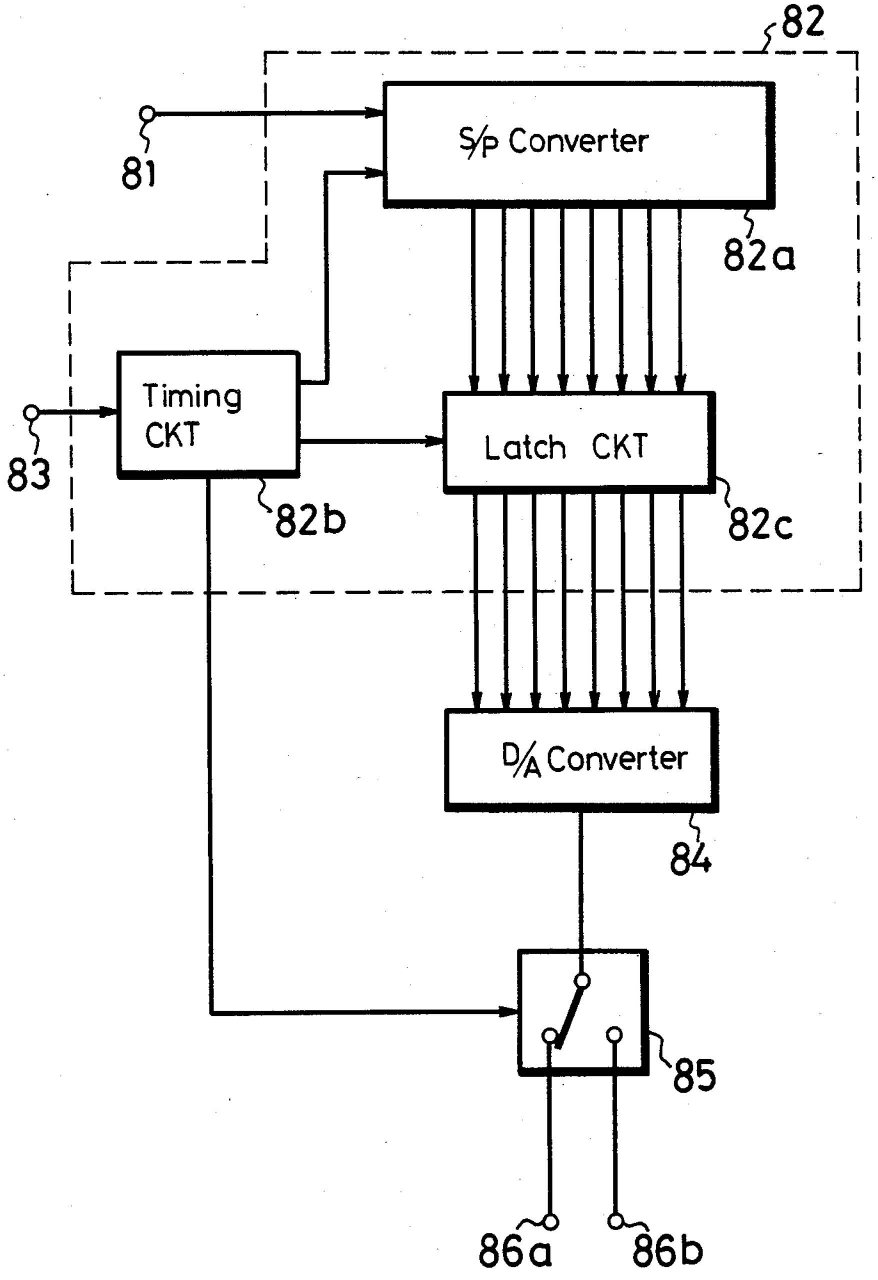
FIG. 10 is a block diagram of a demodulator for use in the present invention.
Figure 11:
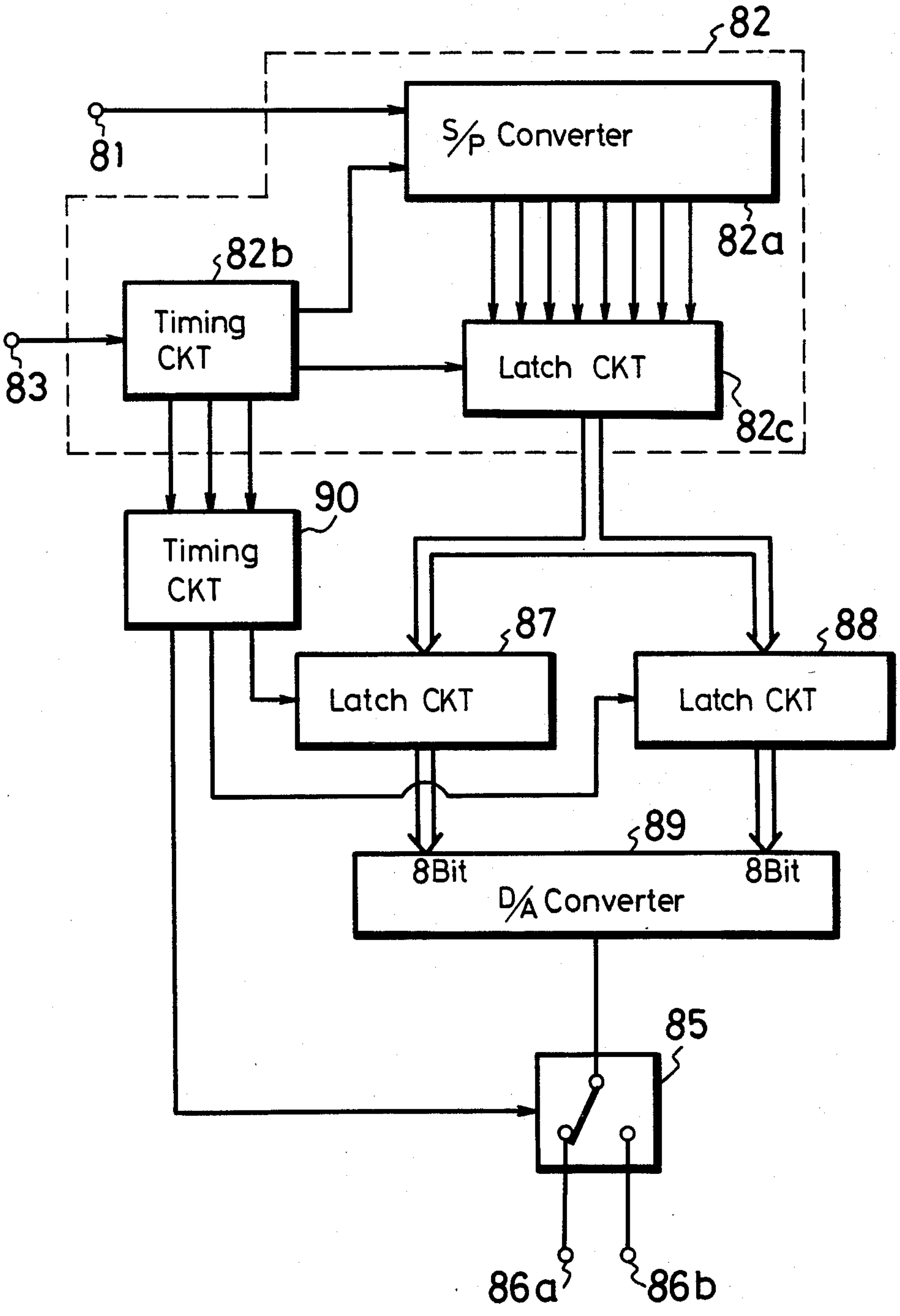
FIG. 11 is a block diagram of a another embodiment of a demodulator for use in the present invention.

Upon transmitting, each of the above modes is selected in advance and its signal is then transmitted. The receiver at the customer location must employ the appropriate decoders, and such decoders are represented in FIGS. 10 and 11. In the decoder of FIG. 10, a common conventional 8-bit digital-to-analog (D/A) convertor is employed as the convertor, whereas in the embodiment of FIG. 11 a conventional 16-bit D/A convertor is employed. Therefore, of the four fundamental modes, the decoder shown in FIG. 10 can be used for the M82 mode, the S82 mode, and the S84 modes, while the decoder of FIG. 11 is employed for the S164 mode. As for the M84 mode, this can be processed substantially the same as the S82 mode and in which case the decoder of FIG. 10 is employed.

Referring now specifically to FIG. 10, input terminal 83 receives a serial data signal having a data format according to any of the above-described format modes produced at the transmitting side, and the serial data at input terminal 81 is fed to a serial-to-parallel (S/P) convertor 82*a*, which forms a part of demodulating circuit 82. Demodulating circuit 82 may be advantageously formed as a single integrated circuit. S/P convertor 82A converts the serial data received at input terminal 81 to parallel signals based upon a clock signal produced by a timing circuit 82b. The output signals thus produced are latched into a latch circuit 82c on an 8-bit by 8-bit basis, as determined by a latch signal also produced by timing circuit 82b.

Figures 12A, 12B, 12C, 12D, 12E, 12F, 12G, 12H:
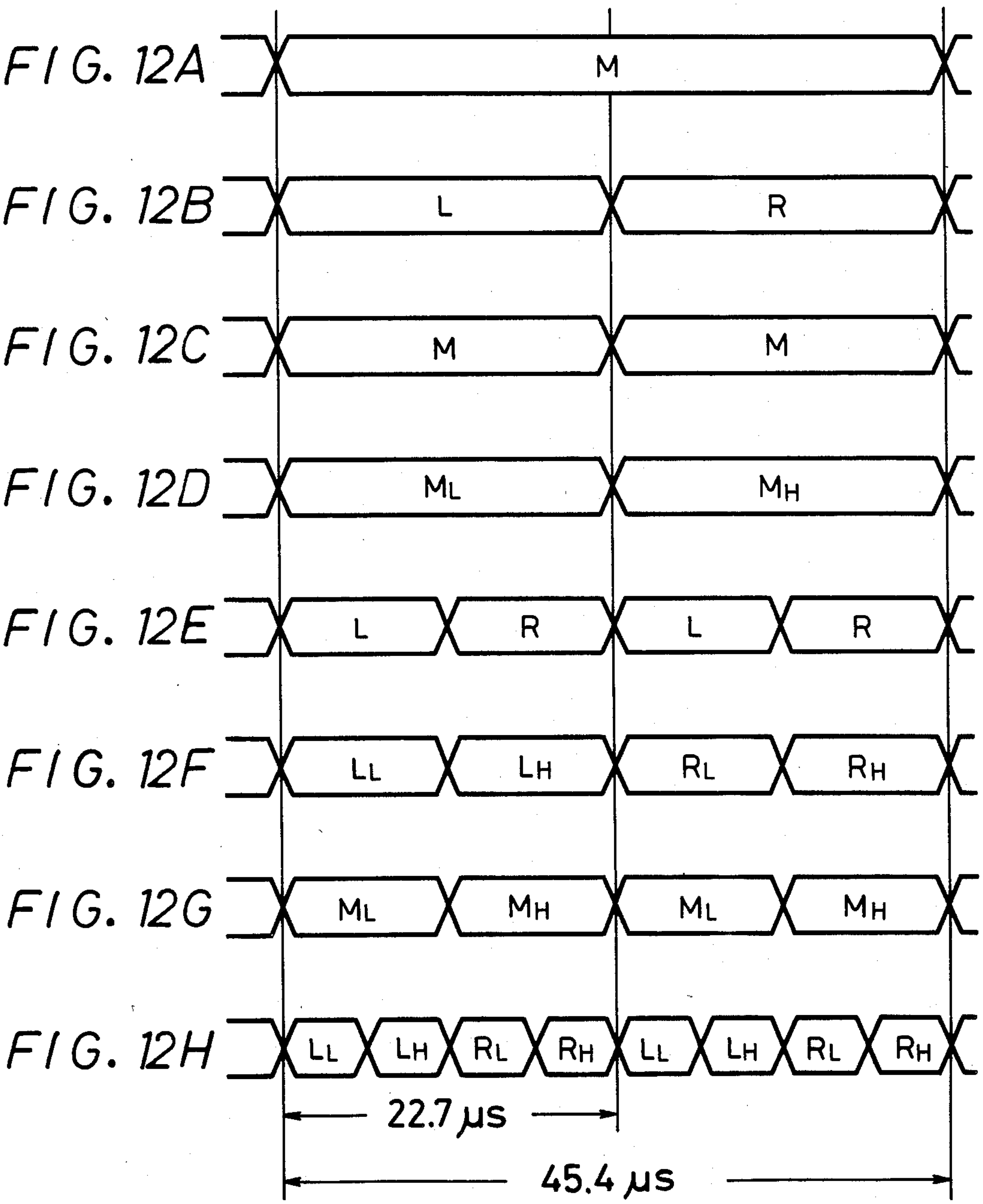
FIGS. 12A–12H are timing waveform diagrams showing the operation of the demodulators of FIGS. 10 and 11.

Therefore, latch circuit 82c produces the 8-bit data of a monaural signal, as might be represented in FIG. 12A, during a period of 45.4 micro-seconds in the M82 mode, whereas latch circuit 82c would produce each 8-bit data of left and right channel stereo signals during a period of 45.4 micro seconds in the S82 mode, as represented in FIG. 12B. Similarly, in the M84 mode, as represented in FIG. 12C, 8-bits of data of two monaural signals is produced during a period of 22.7 micro-seconds and in the M162 mode, as represented in FIG. 12D, the lowermost 8-bit data of the 16-bit monaural signal is produced during the first half period of 45.8 micro-seconds, while the upper 8-bits of data is produced in the latter half of the second half of the 45.4 micro-seconds period.

FIG. 12E represents the S84 mode, in which each 8-bits of data of the left and right channel stereo signal is produced during a period of 22.7 micro-seconds by latch circuit 82c. FIG. 12F represents the S162 mode in which lower 8-bits of data and upper 8-bits of data of a left channel stereo signal are produced during the first half of the 45.4 micro-seconds period, whereas the lower 8-bits of data and upper 8-bits of data of the right channel stereo signal are produced during the latter half of this period. In the M164 mode, as represented in FIG. 10G, the lower 8-bits of data of the 16 bit monaural signal are produced during the former half of the 22.7 micro-seconds period, while the upper 8-bits of data thereof is produced during the latter half of such period.

The selection of any of the above modes is of course made in advance by a mode selection signal, which can then be fed to timing circuit 82b, fed in at input terminal 83. The state of such mode selecting signal as required to set each of the fundamental modes S164, S84, S82, and M82 has a code indicated in Table II as set forth hereinbelow.

TABLE II

| Mode | M1 | M0 | C2 | C1 | C0 |
|---|---|---|---|---|---|
| S164 | 0 | 0 | x | x | x |
| S84-1 | 0 | 1 | x | x | 0 |
| -2 | 0 | 1 | x | x | 1 |
| S82-1 | 1 | 0 | x | 0 | 0 |
| -2 | 1 | 0 | x | 0 | 1 |
| -3 | 1 | 0 | x | 1 | 0 |
| -4 | 1 | 0 | x | 1 | 1 |
| M82-1 | 1 | 1 | 0 | 0 | 0 |
| -2 | 1 | 1 | 0 | 0 | 1 |
| -3 | 1 | 1 | 0 | 1 | 0 |
| -4 | 1 | 1 | 0 | 1 | 1 |
| -5 | 1 | 1 | 1 | 0 | 0 |
| -6 | 1 | 1 | 1 | 0 | 1 |
| -7 | 1 | 1 | 1 | 1 | 0 |
| -8 | 1 | 1 | 1 | 1 | 1 |

Table II represents that each of the fundamental modes may be specified by two bits (M1, M0) and the channel of each mode may be specified by three bits (C2, C1, C0). Thus, in the decoder of FIG. 10, for example, because the S84 mode, the S82, and the M82 are able to be processed, the mode selection signal corresponding to each of the above modes, and formed of bit sequences as indicated in Table II, must be supplied at input terminal 83. The various states in Table II in which the result is irrelevant, that is, "don't care" are represented by an x.

In all events, the output signal from a latch circuit 82c is fed to 8-bit D/A convertor 84 wherein the data are converted from digital parallel signals to a single analog signal fed to a selector input of switch 85. Switching circuit 85 is operable to change the input signal betwen two separate outputs in response to a left/right switching signal produced by timing circuit 82b so that the output signal from D/A convertor 84 is fed to output terminals 86a and 86b alternately. Thus, in the case of a stereo mode signal the left channel signal is delivered to one of the output terminals, 86a or 86b, and the right channel signal is delivered to the other output terminal. Conversely, in the case of the monaural mode, the monaural signal is delivered to both output terminals 86a and 86b by a bridging action of switching circuit 85 (not shown).

The decoder of FIG. 11 is required for th S164 mode and employs two latch circuits 87 and 88, which correspond to the lower 8-bits and upper 8-bits of the 16-bit signal, respectively, are arranged at the output stage of latch circuit 82c and a 16-bit D/A convertor 89 is connected at the outputs of latch circuits 87 and 88. A timing circuit 90 is provided that receives inputs from timing circuit 82b and provides latch signals for latch circuits 87 and 88 and also provides the left/right switching signal fed to switching circuit 85. Timing circuit 90 provides the appropriate control signals based upon the sampling signals having frequencies of 22.05 KHz, 44.1 KHz, and the left/right switching signal, as applied thereto from timing circuit 82b. In order to have timing circuit 82b provide the appropriate timing signals to timing circuit 90, and because the selected mode is the S164 mode, the mode selection signal formed in accordance with the bit series shown in the first row of Table II must be fed into terminal 83. As in the decoder of FIG. 10, the serial data is fed in at input terminal 81 and input to serial-to-parallel convertor 82a, in which it is converted in accordance with a control signal from timing circuit 82b and then latched into latch circuit 82c. Output of data from latch 82c is performed in accordance with latching circuit from timing circuit 82b such that the lower 8-bits of data of the 16-bit data is latched into latch circuit 87, while the upper 8-bits of data is latched into latch circuit 88. Accordingly, at the output of latch circuits 87 and 88 are the lower eight bits and the upper eight bits of the left channel stereo signal during the first half of the 22.7 micro-second period and the lower eight bits and the upper eight bits of the right channel stereo signal during the second half thereof. This arrangement is represented in FIG. 12H. The outputs of latch circuits 87 and 88 are fed to D/A convertor 89 wherein they are converted to analog signals and fed as inputs to switching circuit 85. Switching circuit 85 is changed in position in response to the left/right switching signal produced by timing circuit 90 and, accordingly, the left channel signal is produced at either one of output terminals 86a or 86b and the right channel signal is produced at the other output terminal.

Although in the above-described embodiment of the present invention four data channels are all divided into a plurality of data word lengths this need not be the case and all that is required in that one data channel be divided into such data lengths. For example, an arbitrary combination of the various modifications in which only one data channel is divided could be provided with the remaining data channels being continuous data instead of being divided. Additionally, it should be understood that while the sampling frequency, data length, and the like are set forth above relative to the different embodiments these parameters are merely examples and the present invention is not limited to these particular values but can be varied as required.

Referring back then to FIGS. 3A and 3B it is noted that service bit signals $SB_1$ to $SB_{255}$ were added to the word synchronizing signals $WS_1$–$WS_{255}$, respectively as being formed of four bits and so one service bit signal is employed over two words. Eight bits of such service bit signal can then be used as the above mode selection signal as might be fed in at terminal 83, for example, the most significant bit (2SB) is assigned to a parity check function, the second significant bit (2SB) is assigned as emergency broadcasting, the third significant bit (3SB) is assigned to facsimile broadcasting, the fourth significant bit (4SB) is assigned to communication broadcasting, the fifth significant bit (5SB) is assigned to stereo broadcast in which the data length is 16-bits, as shown for example in FIG. 4A, the sixth significant bit (6SB) is assigned to stereo broadcasting, in which the data length is 8-bits, as represented in FIG. 4B, the seventh significant bit (7SB) is assigned to monaural broadcasting, in which the data length is 8-bits, as represented in FIG. 4C, and the least significant bit (LSB) is assigned to the transmission of computer software, such as computer games or the like. In the use of such service bit signals employing 8-bits as described hereinabove, when any one bit is a "1" then the terminal on the receiving side is controlled to carry out the operation corresponding thereto. The logical state of this signal may be chosen as required.

Figure 13:
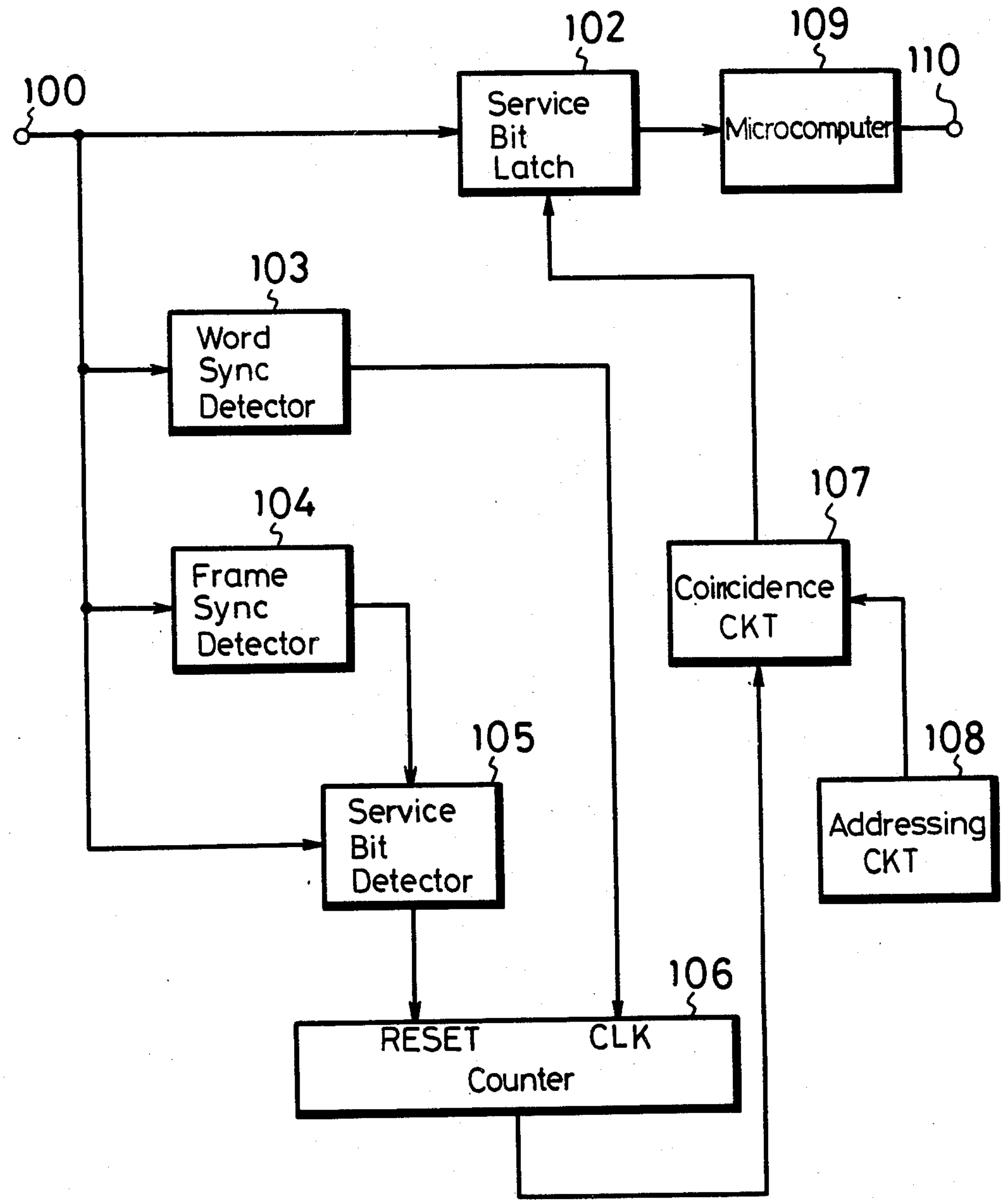
FIG. 13 is a block diagram of an embodiment of an addressing circuit according to the present invention.

Because the frame synchronizing signal and the word synchronizing signal can be easily discriminated one from another at the receiving side, it is possible to readily identify 256 addresses for 256 words included in one frame, for example, as seen in FIG. 3A. Thus, on the basis of the contents of the service bits added to each word synchronizing signal, it is possible to carry out the various services corresponding thereto, as explained hereinabove. Nevertheless, when it is required to provide addresses that exceed 256 in number, some further action must be taken. Therefore, the service bit SBf which is added to the frame synchronizing signal FS is provided with any desired 4-bit pattern, which can represent, for example, a start pattern involving the beginning of addressing, a continuous pattern representing the continuity of addressing, and an end pattern which represents the end of addressing and so forth. These patterns can then be followed by the frame synchronizing signal FS of an arbitrary number in accordance with the scale of the system. Accordingly, when the word synchronizing signals are sequentially counted from the frame synchronizing signals that are added with the service bits of the start pattern, a large number of addresses can be suitably assigned. FIG. 13 schematically illustrates in block diagram form an embodiment of a practical circuit to accomplish this.

In FIG. 13, input terminal 100 receives information having the above-described signal format and such information is fed to a service bit latch 102, to a word synchronization detector 103, to a frame synchronization detector 104, and to a service bit detector 105 for detecting the service bit that is added to the frame synchronizing signal. Word synchronization detector 103 sequentially detects the word synchronizing signal arranged between respective frame synchronizing signals, as seen for example in FIGS. 3A and 3B, and supplies the detected word synchronizing signal as a clock signal to a counter 106, in which such clock signals are counted up. The frame synchronizing detector 104 operates to detect the frame synchronizing signal added at the beginning of each frame, as represented in FIG. 3A, and produces an output signal fed to service detector 105 that operates as its drive signal. Service bit detector 105, when receiving the output signal from frame synchronizing detector 104, detects the service bit added to the frame synchronizing signal and identifies the particular pattern, that is, the pattern of the start, continuous, and end patterns, to which such service bit belongs. In the event the service bit belongs to the start pattern, service bit detector 105 produces at its output a reset signal, whereby the contents of counter 106 are cleared. Thus, in synchronism with the frame synchronizing signal added with the service bits that represents the start pattern, counter 106 will sequentially count up the word synchronizing signal following the frame synchronizing signal. If the identified pattern represents the continuous pattern, then the count operation of counter 106 is continued and ultimately ended when the fram synchronizing signal is added with the service bit, which indicates that the end pattern is detected.

The output of counter 106 is fed to one input of coincidence circuit 107 and operates as the address data therefor. This input is compared with another address data signal fed into the other input of coincidence circuit 107 from an addressing circuit 108, in which self-addressing data, that is, the address number, has been stored in advance. When the two address data signals fed into coincidence circuit 107 are in agreement, coincidence circuit 107 produces an output signal fed to service bit latch 102, which operates as the latching signal. Because service bit latch 102 is continuously supplied with the received data at input terminal 100, when the latching signal from coincidence circuit 107 is received, service bit latch circuit 102 will latch the service bit added to the word synchronizing signal at that time as its self-service bit. The latched service bit is then supplied to a microcomputer 109, which produces system control signals at its output terminal 110 in accordance with the contents of the service bit. As a result, based upon the system control signal, operation of the corresponding apparatus (not shown) is controlled by the microcomputer 109.

As seen from the above, because the service bit is used to control the state of each receiving terminal, communications, emergency broadcasting, facsimile transmission or the like are possible only to the specified user and, moreover, in the situation where charges are made for the various services, such as pay audio, pay channel television, or pay computer games, the receiver at the terminal side can be controlled (addressed) to allow only the appropriate subscribers to enjoy the appropriate service.

Accordingly, with the present invention because at least one channel of digital signals among a plurality of channels is divided into a series of shorter data lengths and each divided data length transmitted within a constant time interval, which interval can be selected, the signal can be transmitted in various modes such as high quality stereo music, multi-channel stereo music, audio services such as news, weather forecasts, communications broadcasting, and the like each requiring segmented multiple channels. For example, in a cable television transmission line where the bandwidth of a typical television channel of 6 MHz is employed, a 16-bit signal having a sampling frequency of 44.1 KHz will permit a music program of up to four stereo channels to be transmitted. When one such standard bandwidth television channel is provided with an 8-bit signal having a sampling frequency of 44.1 KHz then up to eight stereo channels of music can be transmitted simultaneously. Thus, subscription music service is quite possible.

Furthermore, in making facsimile transmissions, and employing the M82 mode, for example, eight channels of facsimile signals can be transmitted simultaneously though a single data channel. This permits use of extremely high speed facsimile receivers and, thus, even greater facsimile transmissions become possible. When transmitting computer software and assuming the M82 mode is being employed, for example, when one bit is assigned to one particular computer software routine 64 different computer software programs can be transmitted simultaneously through one data channel.

According to the present invention, because the service bit added to the frame synchronization signal as auxiliary information is detected and the word synchronization signal is sequentially counted thereby to identify the address state, addressing over a plurality of frames is possible. This means that when a system has a very large number of receiver terminals it is possible to easily control the receiving state at each of these terminals, because a very large number of addresses are afforded by spreading the addressing over a plurality of frames.

Although illustrative embodiments of the present invention have been described in detail above with reference to the accompanying drawings, it is understood that the invention is not limited to those precise embodiments, and that various changes and modifications can be effected therein by one skilled in the art without departing from the scope or spirit of the invention, as defined by the appended claims.

What is claimed is:

1. An address circuit for addressing CATV terminals; said circuit comprising:

a signal input terminal connected to a CATV transmission line for receiving digital signals that are transmitted through said transmission line and include frame synchronizing signals, word synchronizing signals, service bit signals, and data signals, each of said service bit signals including a plurality of bits forming one of a plurality of possible patterns, said patterns respectively representing at least the start, continuation and end of a counting function;

a frame synchronization detector connected to said signal input terminal for detecting said frame synchronizing signals;

a word synchronization detector connected to said signal input terminal for detecting said word synchronizing signals;

a service bit detector connected to said signal input terminal and said frame synchronization detector for detecting a predetermined service bit signal after each of said frame synchronizing signals has been detected and for identifying said one of said patterns; and counter means connected to said service bit detector and said word synchronization detector for counting said word synchronizing signals under the control of said service bit detector and for producing an address control signal for selectively addressing said CATV terminals.

2. An address circuit for addressing CATV terminals according to claim 1; further comprising:

an addressing circuit for storing an address; and a coincidence circuit jointly responsive to said counter means and said addressing circuit, said coincidence circuit producing an output signal when said address control signal and said stored address coincide.

3. An address circuit for addressing CATV terminals according to claim 2; further comprising a service bit latch connected to said input terminal and responsive to said output signal to latch a service bit corresponding to the service bit signal then received at said input terminal.

4. An address circuit for addressing CATV terminals according to claim 3, further comprising computer means responsive to said latched service bit for producing system control signals.

* * * * *